# United States Patent [19]

Gallagher

[11] Patent Number: 5,208,271
[45] Date of Patent: May 4, 1993

[54] FLEXIBLE POLYURETHANE FOAMS WITH REDUCED TENDENCY FOR SHRINKAGE

[75] Inventor: James A. Gallagher, Grosse Ile, Mich.

[73] Assignee: BASF Corporation, Parsippany, N.J.

[21] Appl. No.: 970,448

[22] Filed: Nov. 2, 1992

[51] Int. Cl.$^5$ ................................................. C09K 3/00
[52] U.S. Cl. .............................. 521/174; 252/182.24; 252/182.25; 252/182.27; 521/176
[58] Field of Search ...................... 252/182.24, 182.25, 252/182.27; 521/174, 176

[56] References Cited

U.S. PATENT DOCUMENTS

| | | | |
|---|---|---|---|
| 3,708,537 | 1/1973 | Groves | 260/556 |
| 4,026,845 | 5/1977 | Kim et al. | 260/2.5 S |
| 4,101,468 | 7/1978 | Perrey et al. | 521/115 |
| 4,108,782 | 8/1978 | Thompson | 252/8.5 |

FOREIGN PATENT DOCUMENTS

0467852A2  1/1992  European Pat. Off. .

OTHER PUBLICATIONS

D. R. Battice & W. J. Lopes, "New Cell Opening Surfactants for Molded High Resiliency Polyurethane Foam," Oct. 1986, pp. 145-148.

Primary Examiner—Morton Foelak
Attorney, Agent, or Firm—Dennis V. Carmen

[57] ABSTRACT

A perfluorinated sulfonamide surfactant is provided which reduces polyurethane foam shrinkage upon demolding. The surfactant is particularly useful to reduce shrinkage of water-blown flexible polyurethane foams without the need for mechanical crushing.

10 Claims, No Drawings

FLEXIBLE POLYURETHANE FOAMS WITH REDUCED TENDENCY FOR SHRINKAGE

1. FIELD OF THE INVENTION

The present invention is related to water-blown flexible polyurethane foams having a reduced tendency to shirk, more particularly to water-blown flexible polyurethane foams containing as a surfactant a perfluorinated sulfonamide.

2. BACKGROUND OF THE INVENTION

To obtain a flexible foam adequately stabilized against collapse and having a good closed-cell structure, it is known to add a surfactant. A flexible foam having a high number of closed cells, however, leads to shrinkage. One means generally employed to open the cells and eliminate foam shrinkage is to mechanically treat the foam by crushing with rollers, with a vacuum technique, or by lancing. It would be desirable, however, to produce a surfactant that stabilizes the foam against collapse while opening the cells of the foam without the necessity for mechanical treatment.

The elimination of foam shrinkage by opening the cells using new types of surfactants was the topic of a paper by D. R. Battice, et al., *New Cell Opening Surfactants For Molded High Resiliency Polyurethane Foam*, 30th Annual Polyurethane Technical Marketing Conference, Oct. 15-17, 1986, pp. 145-148. The new surfactants that promoted good cell drainage and eliminated foam shrinkage were identified as X2-5249 and X2-5256, both silicone-based and manufactured at the time by Dow Corning. These surfactants successfully reduced foam shrinkage over a previous Dow Corning ® 5043 surfactant.

3. SUMMARY OF THE INVENTION

It is an object of the invention to provide an alternate surfactant which reduces or eliminates shrinkage of flexible polyurethane foams, including the integral skin foams. This object is achieved by employing as a surfactant a perfluorinated sulfonamide compound represented by the following general formula:

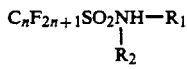

wherein $R_1$ are $R_2$ are each independently hydrogen or a branched or unbranched alkyl, aryl, aralkyl having 1-20 carbon atoms; with $R_1$ and $R_2$ optionally being bonded end to end as a heterocyclic ring; and $R_1$ and $R_2$ optionally containing internal to a carbon chain the groups —NR'—, —NR'$_2$—, —O—, —SO$_2$—, —COO—, —OOC—, —CO—, —CONR—, —NR-'CO—, or —SO$_2$NR', and/or preferably with at least one of $R_1$ or $R_2$ terminated with —OH, —COOH, —NH$_2$, —NHR', or —COH, wherein R' is independently a branched or unbranched alkyl having up to 18 carbon atoms, and n is from four (4) to twenty (20).

A preferred subgenus is $R_1$ and $R_2$ each independently comprising a branched or unbranched alkyl having from 1 and 8 carbon atoms, and independently terminated with a hydroxyl group, with n being from 6 to 10. A more preferred species is N-ethyl-N-2-hydroxyethyl perfluoro octane sulfonamide.

It has been found that perfluoro sulfonamide surfactants used in the invention prevent shrinkage of molded flexible polyurethane foams, avoiding the necessity for mechanical crushing, and provide suitable alternatives to silicone-based surfactants. Suitable amounts of the surfactant are the minimum necessary to stabilize the foam against collapse while preventing shrinkage. Illustrative amounts range from 0.1 pbw to 5 pbw based on 100 pbw of polyol, preferably from 1.0 pbw to 2.5 pbw.

Methods of forming the sulfonamides are known and generally described in U.S. Pat. No. 4,101,468, incorporated herein by reference. For example, a fluorinated alkyl sulphochloride may be reacted with an amine to yield the corresponding fluorinated alkyl sulfonamide.

The organic polyisocyanates may include all essentially known aliphatic, cycloaliphatic, araliphatic, and preferably aromatic polyhydric isocyanates. Specific examples include: alkylene diisocyanates with 4 to 12 carbons in the alkylene group such as dodecane 1,12-diisocyanate, 2-ethyltetramethylene-1,4-diisocyanate, 2methylpentamethylene-1,5-diisocyanate, tetramethylene-1,4-diisocyanate and preferably hexamethlene-1,6-diisocyanate; cycloaliphatic diisocyanates such as cyclohexane-1,3- and 1,4-diisocyanate as well as any mixtures of these isomers, 1-isocyanato-3,3,5-trimethyl-t-isocyanatomethylcyclohexane (isophorone diisocyanate), hexahydrotoluene-2,4- and 2,6-diisocyanate as well as the corresponding isomer mixtures, dicyclohexylmethane-4,4'-, 2,2'-, and 2,4'-diisocyanate as well as the corresponding isomer mixtures and preferably aromatic diisocyanates and polyisocyanates such as toluene-2,4- and 2,6-diisocyanate and the corresponding isomer mixtures, diphenylmethane-4,4'-, 2,4'-, and 2,2'-diisocyanate and the corresponding isomer mixtures, mixtures of diphenylmethane 4,4'- and 2,4'-diisocyanates, polyphenyl-polymethylene polyisocyanates, mixtures of diphenylmethane-4,4'-, 2,4', and 2,2'-diisocyanates and polyphenylpolymethylene polyisocyanates (crude MDI) as well as mixtures of crude MDI and toluene diisocyanates can be used individually or in the form of mixtures.

Frequently, so-called modified polyhydric isocyanates, i.e., products obtained by chemical reaction of organic diisocyanates and/or polyisocyanates are used. Examples include diisocyanates and/or polyisocyantes containing ester groups, urea groups, biuret groups, allophanate groups, carbodiimide groups, isocyanurate groups, uretdione groups, and/or urethane groups. Specific examples include organic, preferably aromatic polyisocyanates containing urethane groups and having an NCO content of 33.6 to 15 weight percent, preferably 31 to 21 weight percent, based on the total weight, e.g., with low molecular diols, triols, dialkylene glycols, trialkylene glycols or polyoxyalkylene glycols with a molecular weight of up to 800, modified diphenylmethane 4,4'-diisocyanate or toluene 2,4- and 2,6-diisocyanate, where examples of di- and polyoxyalkylene glycols that may be used individually or as mixtures include diethylene glycol, dipropylene glycol, polyoxyethylene glycol, polyoxypropylene glycol and polyoxypropylene polyoxyethylene glycols. Prepolymers containing NCO groups with an NCO content of 25 to 3.5 weight percent, preferably 21 to 14 weight percent, based on the total weight and produced from the polyester polyols and/or preferably polyether polyols described below and diphenylmethane 4,4'-diisocyanate, mixtures of diphenylmethane-2,4'- and 4,4'-diisocyanate, toluene-2,4- and/or 2,6-diisocyanates or crude MDI are also suitable. Furthermore, liquid polyisocyanates containing carbodiimide groups and/or isocyanurate rings and having an NCO content of 33.6 to 15 weight percent, preferably 31 to 21 weight percent, based on the total weight, are also suitable, e.g., based on diphenylmethane 4,4'-, 2,4', and/or 2,2'-diisocyanate and/or toluene 2,4- and/or 2,6 -diisocyanate.

The modified polyisocyanates may optionally be mixed together or mixed with unmodified organic polyisocyanates such as diphenylmethane 2,4'- and 4,4'-diisocyanate, crude MDI, toluene 2,4'- and/or 2,6-diisocyanate.

The following have proven especially successful as organic polyisocyanates and are preferred for use in the production of flexible polyurethane foams: prepolymers containing NCO groups and having an NCO content of 9 to 25 weight percent, especially those based on polyether polyols and one or more diphenylmethane diisocyanate isomers, preferably diphenylmethane 4,4'-diisocyanate, and/or modified organic polyisocyanates containing urethane groups and having an NCO content of 15 to 33.6 weight percent, especially those based on diphenylmethane 4,4'-diisocyanate or diphenylmethane diisocyanate isomer mixtures; mixtures of toluene 2,4- and 2,6-diisocyanates, mixtures of toluene diisocyanates and crude MDI or especially mixtures of the aforementioned prepolymers based on diphenylmethane diisocyanate isomers and crude MDI.

Preferred high molecular compounds having at least two reactive hydrogens include those with a functionality of 2 to 8, preferably 2 to 6, and a molecular weight of 400 to 8,000, preferably 1,200 to 6,000. For example, polyether polyamines and/or preferably polyols selected from the group of polyether polyols, polyester polyols, polythioether polyols, polyester amides, polyacetals containing hydroxyl groups and aliphatic polycarbonates containing hydroxyl groups or mixtures of at least two of the aforementioned polyols have proven suitable. Polyester polyols and/or polyether polyols are preferred.

Suitable polyester polyols can be produced, for example, from organic dicarboxylic acids with 2 to 12 carbons, preferably aliphatic dicarboxylic acids with 4 to 6 carbons, and polyhydric alcohols, preferably diols, with 2 to 12 carbons, preferably 2 to 6 carbons. Examples of dicarboxylic acids include succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids can be used individually or in mixture. Instead of the free dicarboxylic acids, the corresponding dicarboxylic acid derivatives may also be used as dicarboxylic acid esters of alcohols with 1 to 4 carbons or dicarboxylic acid anhydrides. Dicarboxylic acid mixtures of succinic acid, glutaric acid and adipic acid in quantity ratios or 20–35:35–50:20–32 parts by weight are preferred, especially adipic acid. Examples of dihydric and polyhydric alcohols, especially diols, include ethanediol, diethylene glycol, 1,2- and 1,3-propanediol, dipropylene glycol, 1,4-butanediol, 1,5-pentanediol, 1,6-hexanediol, 1,10-decanediol, glycerol, and trimethylolpropane. Ethanediol, diethylene glycol, 1,4-butanediol, 1,5-pentanediol, 1,6-hexanediol, or mixtures of at least two of these diols are preferred, especially mixtures of 1,4-butanediol, 1,5-pentanediol, and 1,6-hexanediol. Furthermore, polyester polyols of lactones, e.g., ε-caprolactone or hydroxycarboxylic acids, e.g., δ-hydroxylcaproic acid, may also be used.

The polyester polyols can be produced by polycondensation or organic polycarboxylic acids, e.g., aromatic or preferably aliphatic polycarboxylic acids and/or derivatives thereof and polyhydric alcohols in the absence of catalysts or preferably in the presence of esterification catalysts, preferably in an atmosphere of inert gases, e.g., nitrogen, carbon monoxide, helium, argon, etc., in the melt at temperatures of 150° to 250° C., preferably 180° to 220° C., optionally under reduced pressure up to the desired acid value, which is preferably less than 10, especially less than 2. In a preferred version, the esterification mixture is subjected to polycondensation at the temperatures mentioned above up to an acid value of 80 to 30, preferably 40 to 30, under normal pressure and then under a pressure of less than 500 mbar, preferably 50 to 150 mbar. Examples of suitable esterification catalysts include iron, cadmium, cobalt, lead, zinc, antimony, magnesium, titanium, and tin catalysts in the form of metals, metal oxides, or metal salts. However, polycondensation may also be performed in liquid phase in the presence of solvents and/or entraining agents such as benzene, toluene, xylene, or chlorobenzene for azeotropic distillation of the water of condensation.

To produce the polyester polyols, the organic polycarboxylic acids and/or derivatives thereof and polyhydric alcohols are preferably polycondensed in a molar ratio of 1:1–1.8, preferably 1:1.05–1.2.

The resultant polyester polyols preferably have a functionality of 2 to 4, especially 2 to 3, and a molecular weight of 480 to 3,000, preferably 1,200 to 3,000, and especially 1,800 to 2,500.

However, polyether polyols, which can be obtained by known methods, are especially preferred for use as the polyols. For example, polyether polyols can be produced by anionic polymerization with alkali hydroxides such as sodium hydroxide or potassium hydroxide or alkali alcoholates such as sodium methylate, sodium ethylate, or potassium ethylate or potassium isopropylate as catalysts and with the addition of at least one initiator molecule containing 2 to 8, preferably 2 to 6, reactive hydrogens or by cationic polymerization with Lewis acids such as antimony pentachloride, boron trifluoride etherate, etc., or bleaching earth as catalysts from one or more alkylene oxides with 2 to 4 carbons in the alkylene group.

Suitable alkylene oxides include, for example, tetrahydrofuran, 1,3-propylene oxide, 1,2- and 2,3-butylene oxide, styrene oxide and preferably ethylene oxide and 1,2-propylene oxide. The alkylene oxides may be used individually, in alternation one after the other, or as a mixture. Examples of suitable initiator molecules include water, organic dicarboxylic acids such as succinic acid, adipic acid, phthalic acid and terephthalic acid, aliphatic and aromatic, optionally N-mono, N,N- and N,N'-dialkyl substituted diamines with 1 to 4 carbons in the alkyl group such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5-, and 1,6-hexamethylenediamine, phenylenediamines, 2,3- 2,4-, and 2,6-toluenediamine, and 4,4-, 2,4'-, and 2,2'-diaminodiphenylmethane.

Suitable initiator molecules also include alkanolamines such as ethanolamine, diethanolamine, N-methyl- and N-ethylethanolamine, N-methyl- and N-ethyldiethanolamine and triethanolamine plus ammonia. Suitable polyhydric alcohols include ethanediol, 1,2- propanediol and 1,3-propanediol, diethylene glycol, dipropylene glycol, 1,4-butanediol, 1,6-hexanediol, glycerol, trimethylolpropane, pentaerythritol, sorbitol, and sucrose, although preferred for flexible foam formation are the dihydric and trihydric alcohols.

The polyether polyols, preferably polyoxypropylene polyols and polyoxypropylene-polyoxyethylene-polyols having a functionality of preferably 2 to 6 and especially 2 to 4 and have a molecular weight of 400 to 8,000, preferably 1,200 to 6,000 and especially 1,800 to 4,000, and suitable polyoxytetramethylene glycols have a molecular weight up to about 3,500.

Suitable polyether polyols also include polymer modified polyether polyols, preferably graft polyether polyols, especially those based on styrene and/or acrylonitrile, which are produced by in situ polymerization of acrylonitrile, styrene or preferably mixtures of styrene and acrylonitrile, e.g., in a weight ratio of 90:10 to 10:90, preferably 70:30 to 30:70, preferably in the aforementioned polyether polyols according to the procedures described in German Patent Nos. 1,111,394; 1,222,669 (U.S. Pat. Nos. 3,304,273; 3,383,351; 3,523,093); 1,152,536 (British Patent No. 1,040,452); and 1,152,537 (British Patent No. 987,618); as well as polyether polyol dispersions containing as the disperse phase, usually in the amount of 1 to 50 weight percent, preferably 2 to 25 weight percent, e.g., polyureas, polyhydrazides, polyurethanes containing tertiary amino groups and/or melamine and described, for example, in European Patent No. B 11,752 (U.S. Pat. No. 4,304,708), U.S. Pat. No. 4,374,209 and German Patent No. A 3,231,497.

Like the polyester polyols, the polyether polyols may be used either individually or in the form of mixtures. Furthermore, they can be mixed with the graft polyether polyols or polyester polyols as well as the polyester amides containing hydroxyl groups, the polyacetals, polycarbonates, and/or polyether polyamines.

Examples of hydroxyl group-containing polyacetals that can be used include, for example, the compounds that can be produced from glycols such as diethylene glycol, triethylene glycol, 4,4'-dihydroxyethoxydiphenyldimethylmethane, hexanediol and formaldehyde. Suitable polyacetals can also be produced by polymerization of cyclic acetals.

Suitable hydroxyl group-containing polycarbonates include those of the known type such as those obtained by reaction of diols, e.g., 1,3-propanediol, 1,4-butanediol, and/or 1,6-hexanediol, diethylene glycol, triethylene glycol or tetraethylene glycol with diaryl carbonates, e.g., diphenyl carbonate, or phosgene.

The polyester amides include the mainly linear condensates obtained from polyvalent saturated and/or unsaturated carboxylic acids and their anhydrides and polyhydric saturated and/or unsaturated amino alcohols or mixtures of polyhydric alcohols and amino alcohols and/or polyamines.

Suitable polyether polyamines can be produced from the polyether polyols mentioned above by known methods. Examples include cyanoalkylation of polyoxyalkylene polyols and subsequent hydrogenation of the nitrile thus formed (U.S. Pat. No. 3,267,050) or partial or complete amination or polyoxyalkylene polyols with amines or ammonia in the presence of hydrogen and catalysts (German Patent No. 1,215,373).

The flexible foam of the invention can be produced with or without the use of chain extenders and/or crosslinking agents. To modify the mechanical properties, e.g., hardness, however, it has proven advantageous to add chain extenders, crosslinking agents, or optionally even mixtures thereof. Suitable chain extenders and/or crosslinking agents include diols and/or triols with a molecular weight of less than 400, preferably 60 to 300. Examples include aliphatic, cycloaliphatic and/or araliphatic diols with 2 to 14 carbons, preferably 4 to 10 carbons, such as ethylene glycol, 1,3-propanediol, 1,10-decanediol, o-, m-, and p-dihydroxycyclohexane, diethylene glycol, dipropylene glycol, and preferably 1,4-butanediol, 1,6-hexanediol and bis(2-hydroxyethyl)hydroquinone, triols such as 1,2,4- and 1,3,5-trihydroxycyclohexane, glycerol and trimethylolpropane and low molecular hydroxyl group-containing polyalkylene oxides based on ethylene oxide and/or 1,2-propylene oxide and the aforementioned diols and/or triols as initiator molecules.

In addition to the aforementioned diols and/or triols, or in mixture with them as chain extenders or crosslinking agents to produce the cellular polyurethane-polyurea elastomers according to this invention, it is also possible to use secondary aromatic diamines, primary aromatic diamines, 3,3'-di- and/or 3,3',5,5'-tetraalkyl-substituted diaminodiphenylmethanes.

Blowing agents that can be used according to this invention include low boiling fluorinated compounds that have little or no solubility in the isocyanate, polyether, or polyester selected from the group of fluorinated or perfluorinated hydrocarbons, perfluorinated ethers, as well as sulfur hexafluoride, chlorofluorocarbons, or water. Preferably, the flexible foams are all water blown although within the scope of the invention are mixtures of water and fluorocarbons or other blowing agents having an ozone depleting potential of less than 0.05. The amount of water used as a blowing agent ranges from 0.5 pbw to 4 pbw based on 100 pbw of the polyol.

Suitable catalysts for producing the cellular plastics according to the polyisocyanate polyaddition process include especially compounds that greatly accelerate the reaction of the hydroxyl group containing compounds of polyol component and optionally with the organic optionally modified polyisocyanates (a). Examples include organic metal compounds, preferably tin compounds such as tin (II) salts of organic carboxylic acids, e.g., tin (II) acetate, tin (II) octoate, tin (II) ethylhexoate and tin (II) laurate, as well as the dialkyltin (IV) salts of organic carboxylic acids, e.g., dibutyltin diacetate, dibutyltin dilaurate, dibutyltin maleate, and dioctyltin diacetate. The organic metal compounds are used alone or preferably in combination with strong basic amines. Examples include amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine, pentamethyldiethylenetriamine, tetramethyldiaminoethyl ester, bis(dimethylaminopropyl)urea, dimethylpiperazine, 1,2-dimethylimidazole, 1-azabicyclo[2.2.0]octane and preferably 1,4-diazabicyclo[2.2.2]octane and alkanolamine compounds such as triethanolamine, triisopropanolamine, N-methyl- and N-ethyldiethanolamine and dimethylethanolamine.

Suitable catalyst also include tris(dialkylamino)-s-hexahydrotriazines, especially tris(N,N-dimethylaminopropyl)-s-hexahydrotriazine, tetraalkylammonium hydroxides such as tetramethylammonium hydroxide, alkali hydroxides such as sodium hydroxide and alkali alcoholates such as sodium methylate and potassium isopropylate as well as alkali salts of long-chain fatty acids with 10 to 20 carbons and optionally OH side groups. A 0.001 to 5 weight percent, especially 0.05 to 2 weight percent, catalyst or catalyst combination based on the weight of polyol component is preferred.

Optionally, other additives and/or processing aids (f) may be incorporated into the reaction mixture to produce the cellular plastics by the polyisocyanate polyaddition process. Examples include surface active substances, fillers, dyes, pigments, flame retardants, hydrolysis preventing agents, fungistatic and bacteriostatic agents.

Examples of surface active substances include compounds that support the homogenization of the starting materials such as the sodium salts of castor oil sulfates or of fatty acids as well as salts of fatty acids with amines, e.g., diethylamine oleate, diethanolamine stearate, diethanolamine ricinoleate, salts of sulfonic acid, e.g., alkali or ammonium salts of dodecylbenzenesulfonic acid or dinaphthylmethanedisulfonic acid and ricinoleic acid. Other foam stabilizers that can be admixed include siloxaneoxyalkylene copolymers and other organopolysiloxanes, ethoxylated alkylphenols, ethoxylated fatty alcohols, paraffin oils, castor oil and ricinoleic acid esters, Turkey red oil, and peanut oil as well as cell regulators such as paraffins, fatty alcohols and dimethyl polysiloxanes. Furthermore, the oligomeric acrylates with polyoxyalkylene and fluoroalkane side groups described above are also suitable for improving the emulsifying effect, the cell structure and/or for stabilizing the foam.

Fillers, especially reinforcing fillers, are understood to refer to the known conventional organic and inorganic fillers, reinforcing agents, weighing agents, agents to improve abrasion properties in paints, coating agents, etc. Specific examples include inorganic fillers such as silicate minerals, e.g., lamellar silicates such as antigorite, serpentine, hornblendes, amphiboles, chrysotile, talc; metal oxides such as kaolin, aluminum oxides, titanium oxides and iron oxides, metal salts such as chalk, heavy spar (barite) and inorganic pigments such as cadmium sulfide, zinc sulfide as well as glass, etc. Kaolin (China clay), aluminum silicate and co-precipitates of barium sulfate and aluminum silicate as well as natural and synthetic fibrous minerals such as wollastonite, metal fibers, and especially glass fibers of various lengths, optionally sized, are preferred. Examples of organic fillers include coal, melamine, colophony, cyclopentadienyl resins and graft polymers as well as cellulose fibers, nylon, polyacrylonitrile, polyurethane and polyester fibers based on aromatic and/or aliphatic dicarboxylic acid esters and especially carbon fibers.

The organic and inorganic fillers may be used individually or as mixtures and are incorporated into the reaction mixture in amounts of 0.5 to 50 weight percent, preferably 1 to 40 weight percent, based on the weight of the isocyanate, polyol, and optional chain extender components.

Suitable flame retardants include, for example, tricresyl phosphate, tris-2-chloroethyl phosphate, trischloropropyl phosphate and tris-2,3-dibromopropyl phosphate.

In addition to the aforementioned halogen substituted phosphates, inorganic flame retardants may also be used such as red phosphorus, aluminum oxide hydrate, antimony trioxide, arsenic oxide, aluminum polyphosphate and calcium sulfate or cyanuric acid derivatives such as melamine or mixtures of at least two flame retardants, e.g., ammonium polyphosphates and a melamine plus optionally cornstarch for making the polyisocyante polyaddition products flame resistant. In general, it has proven expedient to use 5 to 50 parts by weight, preferably 5 to 25 parts by weight, of the aforementioned flame retardants for each 100 parts by weight of the polyol component.

Details regarding the aforementioned other conventional additives and processing aids can be obtained from the technical literature, e.g., the monograph by J. H. Saunders and K. C. Frisch, "High Polymers," Volume XVI, *Polyurethanes*, Parts 1 and 2, Interscience Publishers, 1962 and 1964 or *Plastics Handbook, Polyurethanes*, Volume VII, Hanser-Verlag, Munich, Vienna, 1st and 2nd Editions, 1966 and 1983.

To produce the cellular plastics containing urea and/or preferably urethane groups, the organic polyisocyanates, high molecular polyol compounds with at least two reactive hydrogens and optional chain extenders and/or crosslinking agents are reacted in amounts such that the equivalent ratio of NCO groups of polyisocyanates to the total reactive hydrogens of the polyol component and optionally amounts to 1:0.85–1.25, preferably 1:0.95–1.15.

The cellular plastics of polyisocyanate polyaddition products, preferably cellular elastomers or especially flexible foams, are produced to advantage by the oneshot process, e.g., with the high pressure or low pressure technique using open or closed molds, e.g., metal molds.

The starting components are mixed at a temperature of 15° to 90° C., preferably 20° to 35° C., and are placed in an open mold or optionally in a closed mold under elevated pressure. The mixing can be performed mechanically by means of a stirrer or by means of a stirring screw or under a high pressure in the so-called counter-current injection method as mentioned above. The mold temperature should be 20° to 60° C., preferably 30° to 60° C., and especially 45° to 50° C.

The soft flexible foams produced by the process according to the invention as well as the corresponding integral foams have a density of 0.02 to 0.75 g/cm$^3$, where the density of the foams is preferably 0.025 to 0.24 g/cm$^3$ and especially 0.03 to 0.1 g/cm$^3$ and the density of the integral foams is preferably 0.08 to 0.75 g/cm$^3$, especially 0.24 to 0.6 g/cm$^3$. The flexible foams and integral foams are used, for example, in the automobile industry, the aircraft industry and the shipbuilding industry, in the furniture and athletic equipment industry and as seating materials.

EXAMPLES

The invention will now be described by means of examples which are not limiting to the scope of the invention but merely illustrative of embodiments within its scope.

| | |
|---|---|
| Polyol A | is a trimethylolpropane-initiated polyoxypropylene polyoxyethylene polyether polyol having 13 weight percent polyoxyethylene cap and a nominal hydroxyl number of about 35. |
| Polyol B | is a 30 weight percent of 1:1 acrylonitrile to styrene graft polyol having a nominal hydroxyl number of 24 in a trimethylolpropane-initiated propylene oxide-ethylene oxide adduct terminated with 13 weight |

|  | -continued |
|---|---|
| Polyol C | percent ethylene oxide. is a 31 weight percent 2:1 acrylonitrile styrene graft polyol in a 95:5 weight percent blend of a glycerine-initiated ethylene oxide/propylene oxide adduct terminated with 18.5 weight percent ethylene oxide and having a nominal hydroxyl number of 35, and glycerine, respectively. |
| Iso A | is an 80:20 blend of 2,4'-and 2,6'-isomers of toluene diisocyanate. |
| DEOA | is diethanolamine, a chain extender. |
| NIAX C-225 | is a complex amine catalyst available from Union Carbide Corporation. |
| FOAMREZ UL-1 | is an organotin catalyst available from WITCO Corp. |
| SURFACTANT 1 | is DC-5043, a high resiliency silicone surfactant available from Air Products. |
| Surfactant 2 | is X2-5249, an experimental surfactant from Dow Corning. |
| Surfactant 3 | is 50 weight percent N-ethyl-N-2-hydroxyethyl-perfluoro octane sulfonamide in toluene. |

Polyol A and C were, along with water, DEOA, NIAX C-225, a tin catalyst FOAMREZ, and Surfactant 3 were handmixed at 3,000 rpm for 30 seconds in the parts by weight shown below in Table 1, Sample 1. To the mixture was added ISO A in the amount shown, mixed for ten (10) seconds, and poured into a 2"×10"×10" mold. The sample was allowed to foam and subsequently tested for shrinkage. The foam blocks were not subject to crushing or mechanical treatment prior to measurement. To measure shrinkage, a ruler was placed from the highest point at each end of the molded foam block and traversing the deepest recession in the block, at which point the distance from the ruler to the deepest point in the recession was measured and is reported below as shrinkage.

Samples 2-6 were repeated using the above procedure but in the amounts and with the materials reported in the table below each sample.

TABLE 1

| SAMPLE | 1* | 2 | 3* | 4* | 5 | 6 |
|---|---|---|---|---|---|---|
| POLYOL A | 60 | 60 | 58.2 | 58.2 | 58.2 | 58.2 |
| POLYOL B | 40 | 40 | — | — | — | — |
| POLYOL C | — | — | 41.8 | 41.8 | 41.8 | 41.8 |
| WATER | 4 | 4 | 4 | 4 | 4 | 4 |
| DEOA | 1.5 | 1.5 | 1.5 | 1.5 | 1.5 | 1.5 |
| NIAX C-225 | 0.7 | 0.7 | 0.7 | 0.7 | 0.7 | 0.7 |
| FOAMREZ UL-1 | 0.015 | 0.015 | 0.015 | 0.015 | 0.015 | 0.015 |
| SURFACTANT 1 | 1.5 | — | 1.5 | — | — | — |
| SURFACTANT 2 | — | — | — | 1.5 | — | — |
| SURFACTANT 3 | — | 1.5 | — | — | 1.5 | 1.0 |
| ISO A | 47.2 | 47.2 | 51.3 | 51.3 | 51.3 | 51.3 |
| SHRINKAGE | 0.4 | 0.0 | 1.9 | 2.1 | 1.4 | 1.2 |

*COMPARATIVE EXAMPLES

The results indicate that a foam prepared with Surfactant 3 within the scope of the invention demonstrated little or no shrinkage. The surfactant of the present invention performed as well, if not better, than the foams prepared using convention Surfactants 1 and 2.

What I claim is:

1. A polyol composition comprising a polyoxyalkylene polyether polyol and a perfluorinated sulfonamide surfactant having the following formula:

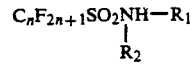

wherein $R_1$ and $R_2$ are each independently hydrogen or a branched or unbranched alkyl, aryl, aralkyl having 1-20 carbon atoms; with $R_1$ and/or $R_2$ optionally being bonded end to end as a heterocyclic ring; and $R_1$ and/or $R_2$ optionally containing as internal to an alkyl chain the groups —NR'—, —NR'$_2$—, —O—, —SO$_2$—, —OOC—, —COO—, —CO—, —CONR'—, —NR'CO—, or —SO$_2$NR'; and/or as terminal to an alkyl chain the groups —OH, —COOH—, —NH$_2$, —NHR$^1$, —COH, and R' is independently a branched or unbranched alkyl having up to 18 carbon atoms; and wherein n is from 4 to 20.

2. The polyol composition of claim 1, further containing water, a chain extender, and a polyurethane promoting catalyst.

3. The polyol composition of claim 1, wherein the amount of surfactant is from 1.0 to 5.0 parts by weight based on 100 parts by weight of polyol.

4. The polyol composition of claim 1, wherein $R_1$ and $R_2$ are each a branched or unbranched alkyl group.

5. The polyol composition of claim 4, wherein the surfactant is N-ethyl-N-2-hydroxyethyl perfluoro octane sulfonamide.

6. A process for the preparation of a polyol composition comprising blending a polyoxyalkylene polyether polyol and a perfluorinated sulfonamide surfactant having the following formula:

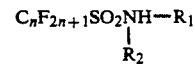

wherein $R_1$ and $R_2$ are each independently hydrogen or a branched or unbranched alkyl, aryl, aralkyl having 1-20 carbon atoms; with $R_1$ and/or $R_2$ optionally being bonded end to end as a heterocyclic ring; and $R_1$ and/or $R_2$ optionally containing as internal to an alkyl chain the groups —NR'—, —NR'$_2$—, —O—, —SO$_2$—, —OOC—, —COO—, —CO—, —CONR'—, —NR'CO—, or —SO$_2$NR'; and/or as terminal to an alkyl chain the groups —OH, —COOH—, —NH$_2$, —NHR$^1$, —COH, and R' is independently a branched or unbranched alkyl having up to 18 carbon atoms; and wherein n is from 4 to 20.

7. The process of claim 6, further containing water, a chain extender, and a polyurethane promoting catalyst.

8. The process of claim 6, wherein the amount of surfactant is from 1.0 to 5.0 parts by weight based on 100 parts by weight of polyol.

9. The process of claim 6, wherein $R_1$ and $R_2$ are each a branched or unbranched alkyl group.

10. The process of claim 6, wherein the surfactant is N-ethyl-N-2-hydroxyethyl perfluoro octane sulfonamide.

* * * * *